United States Patent
Doida

(10) Patent No.: US 8,194,148 B2
(45) Date of Patent: Jun. 5, 2012

(54) IMAGE PROCESSING DEVICE, ELECTRONIC CAMERA AND IMAGE PROCESSING PROGRAM

(75) Inventor: Shigeru Doida, Kawasaki (JP)

(73) Assignee: Nikon Corporation, Tokyo (JP)

( * ) Notice: Subject to any disclaimer, the term of this patent is extended or adjusted under 35 U.S.C. 154(b) by 444 days.

(21) Appl. No.: 12/309,684

(22) PCT Filed: Sep. 7, 2007

(86) PCT No.: PCT/JP2007/000979
§ 371 (c)(1),
(2), (4) Date: Jan. 27, 2009

(87) PCT Pub. No.: WO2008/032442
PCT Pub. Date: Mar. 20, 2008

(65) Prior Publication Data
US 2010/0007754 A1    Jan. 14, 2010

(30) Foreign Application Priority Data

Sep. 14, 2006  (JP) .................................. 2006-249020
Sep. 14, 2006  (JP) .................................. 2006-249021

(51) Int. Cl.
*H04N 5/228* (2006.01)
(52) U.S. Cl. ...................... 348/222.1; 348/584; 382/216; 358/3.27
(58) Field of Classification Search ............... 348/222.1, 348/229.1, 207.99, 571–721, 231.2; 382/216, 382/294, 236; 358/3.27, 448, 450, 540
See application file for complete search history.

(56) References Cited

U.S. PATENT DOCUMENTS

| | | | |
|---|---|---|---|
| 5,754,692 A | 5/1998 | Kondo et al. | |
| 6,788,338 B1* | 9/2004 | Dinev et al. | 348/222.1 |
| 7,920,170 B2* | 4/2011 | Sonoda | 348/220.1 |
| 2002/0085122 A1* | 7/2002 | Konuma | 348/584 |
| 2005/0069195 A1* | 3/2005 | Uezono et al. | 382/154 |
| 2005/0163402 A1 | 7/2005 | Aiso | |
| 2005/0219642 A1* | 10/2005 | Yachida et al. | 358/448 |
| 2006/0012830 A1 | 1/2006 | Aiso | |

(Continued)

FOREIGN PATENT DOCUMENTS

JP    A-2002-051252    2/2002

(Continued)

OTHER PUBLICATIONS

Office Action dated Mar. 27, 2012 issued in related Japanese Patent Application No. 2007-233227. (with English language translation).

*Primary Examiner* — Tuan Ho
*Assistant Examiner* — Kent Wang
(74) *Attorney, Agent, or Firm* — Oliff & Berridge, PLC

(57) ABSTRACT

The image processing device of the present invention is provided with an image input section, a position discrepancy detecting section, and an image composition section. The image input section reads a plurality of low resolution images imaging a same object, and at least one high resolution image imaging a same object. The position discrepancy detecting section detects position discrepancy of patterns between respective low resolution images and the high resolution image. The image composition section positions and composes patterns of the plurality of low resolution images based on the position discrepancy.

21 Claims, 11 Drawing Sheets

U.S. PATENT DOCUMENTS

| | | | |
|---|---|---|---|
| 2006/0215061 A1* | 9/2006 | Negishi et al. | 348/584 |
| 2007/0058875 A1* | 3/2007 | Tabata et al. | 382/239 |
| 2007/0181686 A1* | 8/2007 | Mowry | 235/454 |
| 2009/0052788 A1 | 2/2009 | Doida | |
| 2009/0167909 A1* | 7/2009 | Imagawa et al. | 348/262 |
| 2010/0053349 A1 | 3/2010 | Watanabe et al. | |

FOREIGN PATENT DOCUMENTS

| | | |
|---|---|---|
| JP | A-2002-107787 | 4/2002 |
| JP | A-2005-130443 | 5/2005 |
| JP | A-2005-318548 | 11/2005 |
| JP | A-2005-345715 | 12/2005 |
| JP | A-2006-140797 | 1/2006 |
| JP | A-2006-033062 | 2/2006 |
| JP | A-2006-140886 | 6/2006 |
| JP | A-2006-202170 | 8/2006 |
| JP | A-2007-135182 | 5/2007 |
| WO | WO 95/04329 | 2/1995 |

* cited by examiner

LOW RESOLUTION IMAGES
(THROUGH IMAGES)

RELOCATED IMAGE

POSITIONING

- MAGNIFICATION PROCESSING
  (PIXEL DISTANCE ADJUSTMENT)
- PIXEL SHIFTING
- MAPPING
- PIXEL INTERPOLATION

IMAGE PROCESSING DEVICE, ELECTRONIC CAMERA AND IMAGE PROCESSING PROGRAM

CROSS-REFERENCE TO RELATED APPLICATION

This application is a U.S. National Stage application claiming the benefit of prior filed International Application Number PCT/JP2007/000979, filed Sep. 7, 2007, in which the International Application claims a priority date of Sep. 14, 2006 based on prior filed Japanese Application Number 2006-249020 and Japanese Application Number 2006-249021 the entire contents of which are incorporated herein by reference.

TECHNICAL FIELD

The present invention relates to an image processing device, an electronic camera and an image processing program.

BACKGROUND ART

Previously, a technique has been known which restores blurring of a picked up image by performing divided exposures for a plurality of times using the same electronic camera, and positioning and composing the plurality of obtained images (refer to, for example, patent document 1 below). Pattern matching, block matching, or the like are known as a processing to detect such position discrepancy of multiple images.

The following patent document 2 is known as a technique of detecting position discrepancy of patterns between images which have been output from separate imaging sensors having different resolutions. This prior art technique first performs a global search between a high resolution image and low resolution images to find candidates of a coincide region. The technique then performs pixel interpolation on both images respectively, in the coincide region to find a region in which the patterns coincide in detail by comparison between interpolated pixels. With such a two-phase search processing, position discrepancy is detected between images having different resolutions.

Patent Document 1: Japanese Unexamined Patent Application Publication No. 2002-107787
Patent Document 2: WO 95/04329

DISCLOSURE

Problems to be Solved

With the prior-art technique, a high resolution still image must be read out over a plurality of times as a result of divided exposure. In this case, since the frame rate of the still image is generally low, time intervals between the images tend to significantly widen. For a moving object, accordingly, the degree of coincidence of patterns among multiple images becomes lower, making it difficult to perform a good image composition.

Meanwhile, low resolution images can be read out in a high frame rate if using a low resolution read-out mode (draft mode) of imaging sensors. In this case, time intervals between the images can be shortened. However, precision of detecting position discrepancy of patterns between low resolution images is rough. Therefore, the patterns can be easily distorted as being such that an edge part between images is slightly displaced, when a pattern is positioned in accordance with a low-precision position discrepancy. As a result, it is also difficult to perform a good image composition by this method.

Additionally, in the prior-art technique, adverse effects caused by position discrepancy of a plurality of images are concerned, as being such that an edge part of a pattern results in multiple lines after composition, or an edge being blurred after composition.

The present invention therefore solves one or more of the above-mentioned problems. One of the propositions of the invention is to provide a technique for performing a good image composition.

Additionally, one of the propositions of the invention is to provide a technique for reducing the adverse effects of mispositioning in the positioning composition of a plurality of images.

Means for Solving the Problems

<1> The image processing device according to a first aspect of the present invention is provided with an image input section, a position discrepancy detecting section, and an image composing section. The image input section reads a plurality of low resolution images with a same object imaged and at least one high resolution image with the same object imaged. The position discrepancy detecting section detects position discrepancy of patterns between respective low resolution images and the high resolution image. The image composition section positions and composes patterns of the plurality of low resolution images based on the position discrepancy.

<2> Preferably, the position discrepancy detecting section is provided with a phase dividing section, and a detail detecting section. The phase dividing section generates a plurality of pieces of mutually phase-shifted sampling information, by performing sub-sampling of the high resolution image or its feature while shifting phases. The detail detecting section detects position discrepancy in smaller unit than pixel distances of the low resolution images by detecting position discrepancy where a feature of patterns best coincides between the low resolution images and the plurality of pieces of sampling information.

<3> Preferably, in addition, the position discrepancy detecting section is provided with a rough detecting section and a detail detecting section. The rough detecting section detects position discrepancy of patterns between a plurality of low resolution images. The detail detecting section detects position discrepancy between the high resolution image and the low resolution images starting from the position discrepancy detected by the rough detecting section.

<4> Preferably, the Image composition section relocates and composes signal components of the plurality of low resolution images based on the position discrepancy, and generates relocated images having higher resolution.

<5> Preferably, in addition, the image composition section generates a composite image based on the high resolution image and the relocated images.

<6> Preferably, the composite image is generated with the composite rate of the relocated images locally reduced progressively at portions where a larger signal difference exists between the high resolution image and the relocated images.

<7> Preferably, the composite image is generated with the composite rate of the relocated images locally reduced progressively at portions where a larger local signal variation of the high resolution image exists.

<8> Preferably, the composite image is generated with the composite rate of the relocated images being generally raised progressively when the time interval and/or position discrepancy between the high resolution image and the low resolution images is smaller.

<9> Preferably, the Image composition section generates the composite image for high visual-sensitivity signal components constituting a color image, whereas the image composition section generates relocated images for the remaining low visual-sensitivity signal components.

<10> The image processing device according to a second aspect of the present invention is provided with an image input section, a position discrepancy detecting section, and an image composition section. The image input section reads a plurality of images with the same object imaged. The position discrepancy detecting section detects position discrepancy of patterns between the plurality of images. The image composition section positions and composes the patterns of the plurality of images based on the position discrepancy. In the above-mentioned configuration, the image composition section judges, among a plurality of images, the magnitude of local signal variation for an image which has been preliminarily set as the reference of positioning. The image composition section makes an adjustment so as to locally lower the composite rate of other images at portions where the signal variation is judged to be large.

<11> The image processing device according to a third aspect of the present invention is provided with an image input section, a position discrepancy detecting section, and an image composition section. The image input section reads a plurality of images with the same object imaged. The position discrepancy detecting section detects position discrepancy of patterns between the plurality of images. The image composition section positions and composes the patterns of the plurality of images based on the position discrepancy. In the above-mentioned configuration, the image composition section finds the difference of gradation value of the target pixels at respective corresponding positions in the positioning reference image and other images. The image composition section makes an adjustment so as to locally lower the composite rate of other images at portions where the difference of gradation value is judged to be large.

<12> The electronic camera according to the first aspect of the present invention is provided with the image processing device described in any one of the above-mentioned <1> to <9>, and an imaging section which images the images of an object with at least two levels of resolution. In this case, a high resolution image processed by the image processing device is taken to be a high resolution still image imaged with the imaging section. On the other hand, a low resolution image processed by the image processing device is taken to be a low resolution image imaged with the imaging section before and/or after imaging the still image.

<13> The electronic camera according to the second aspect of the present invention is provided with the image processing device described in the above <10> or <11>, and the imaging section which consecutively images the images of an object and generates a plurality of images, the electronic camera having a function of positioning and composing a plurality of images using the image processing device.

<14> The image processing program of the present invention is a program which causes the computer to function as the image processing device described in any one of the above-mentioned <1> to <11>.

Effects

In one aspect of the present invention, low resolution images having a high frame rate are composed. Therefore, the degree of coincidence of patterns among images increases, thereby enabling a better image composition.

Furthermore, in one aspect of the present invention, position discrepancy corresponding to each of a plurality of low resolution images is detected, using a high resolution image with a high pixel density as the position reference. Therefore, relative position discrepancy of the low resolution images can be detected with a high precision. As a result, positioning precision of the patterns of the low resolution images is high, thereby a better image composition becomes possible.

Additionally, in another aspect of the present invention, the composite rate of the images, which is positioned at portions where signal variation of the positioning reference image is large or portions where gradation difference between the images is large, locally decreases. Therefore, distortion of image structure caused by mis-positioning can be suppressed.

DETAILED DESCRIPTION OF THE EMBODIMENTS

Description of First Embodiment

[Description of Electronic Camera Configuration]

Figure 1:
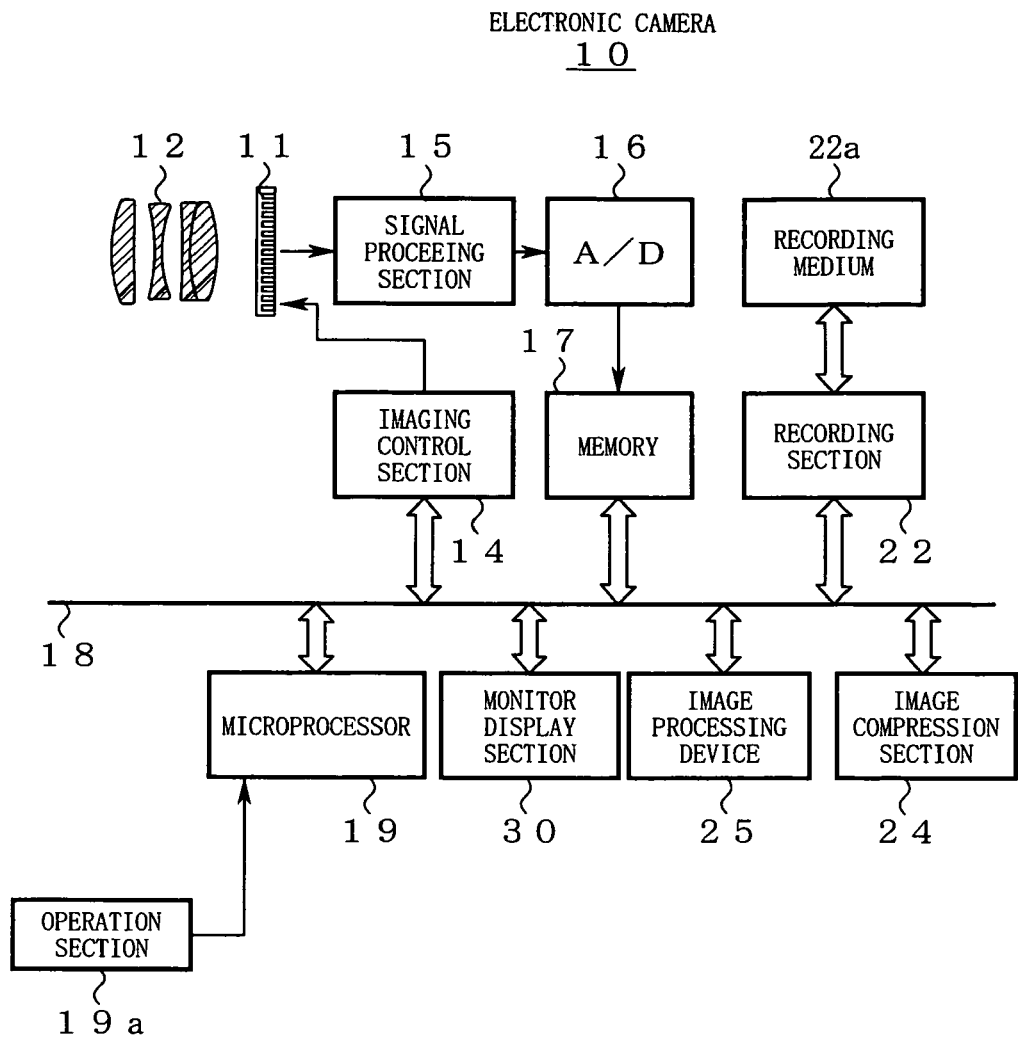
FIG. 1 is a block diagram showing the electronic camera 10 (including the image processing device 25).

FIG. 1 is a block diagram showing an electronic camera 10 (including image processing device 25) of the present embodiment.

In FIG. 1, the electronic camera 10 has an imaging lens 12 equipped therein. The imaging surface of an imaging sensor 11 is provided in the image space of the imaging lens 12. The imaging sensor 11 is controlled by an imaging control section 14. The imaging sensor 11 is provided with a mode of reading high resolution images and a mode of reading low resolution images by thinning or adding pixels within the element. The image signal output from the imaging sensor 11 is temporarily stored in a memory 17 after being processed by a signal processing section 15 and an analog-to-digital conversion part 16.

The memory 17 is coupled to a bus 18. An imaging control section 14, a microprocessor 19, a recording section 22, an image compression section 24, a monitor display section 30, and an image processing device 25 are also coupled to the bus 18. An operation section 19a such as a release buttons is coupled to the above-mentioned microprocessor 19. In addition, a recording medium 22a is detachably mounted on the recording section 22.

[Description of Image Processing Device 25]

Figure 2:
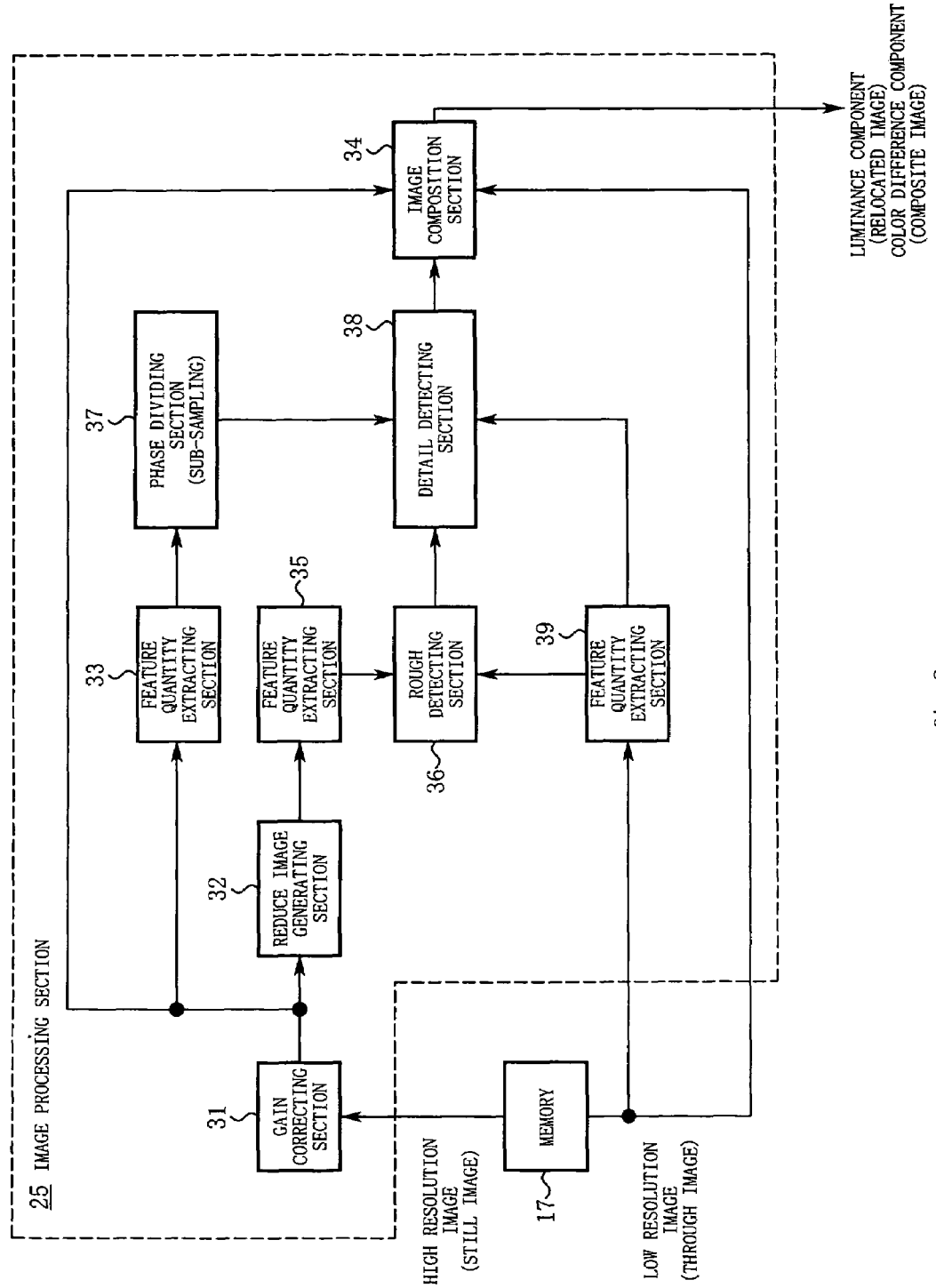
FIG. 2 is a block diagram schematically showing a configuration of the image processing device 25.

FIG. 2 is a block diagram schematically showing a configuration of the image processing device 25.

The high resolution image read out from the memory 17 is supplied to a reduced image creating section 32, a feature quantity extracting section 33, and an image composition section 34, respectively via a gain correcting section 31. Output data of the reduced image creating section 32 is supplied to the rough detecting section 36 via a feature quantity extracting section 35. Output data of the feature quantity extracting section 33 is supplied to a detail detecting section 38 via a phase dividing section 37.

On the other hand, a plurality of low resolution images read out from the memory 17 are supplied to a feature quantity extracting section 39 and the image composition section 34, respectively. Output data of the feature quantity extracting section 39 is supplied to the rough detecting section 36 and a detail detecting section 38, respectively.

The position discrepancy which is roughly detected in the rough detecting section 36 is supplied to the detail detecting section 38. The position discrepancy which is detected with a high precision in the detail detecting section 38 is supplied to the image composition section 34. Based on the detection result of the position discrepancy, the image composition section 34 composes a plurality of low resolution images and high resolution images.

[Description of Operation]

Figure 3:
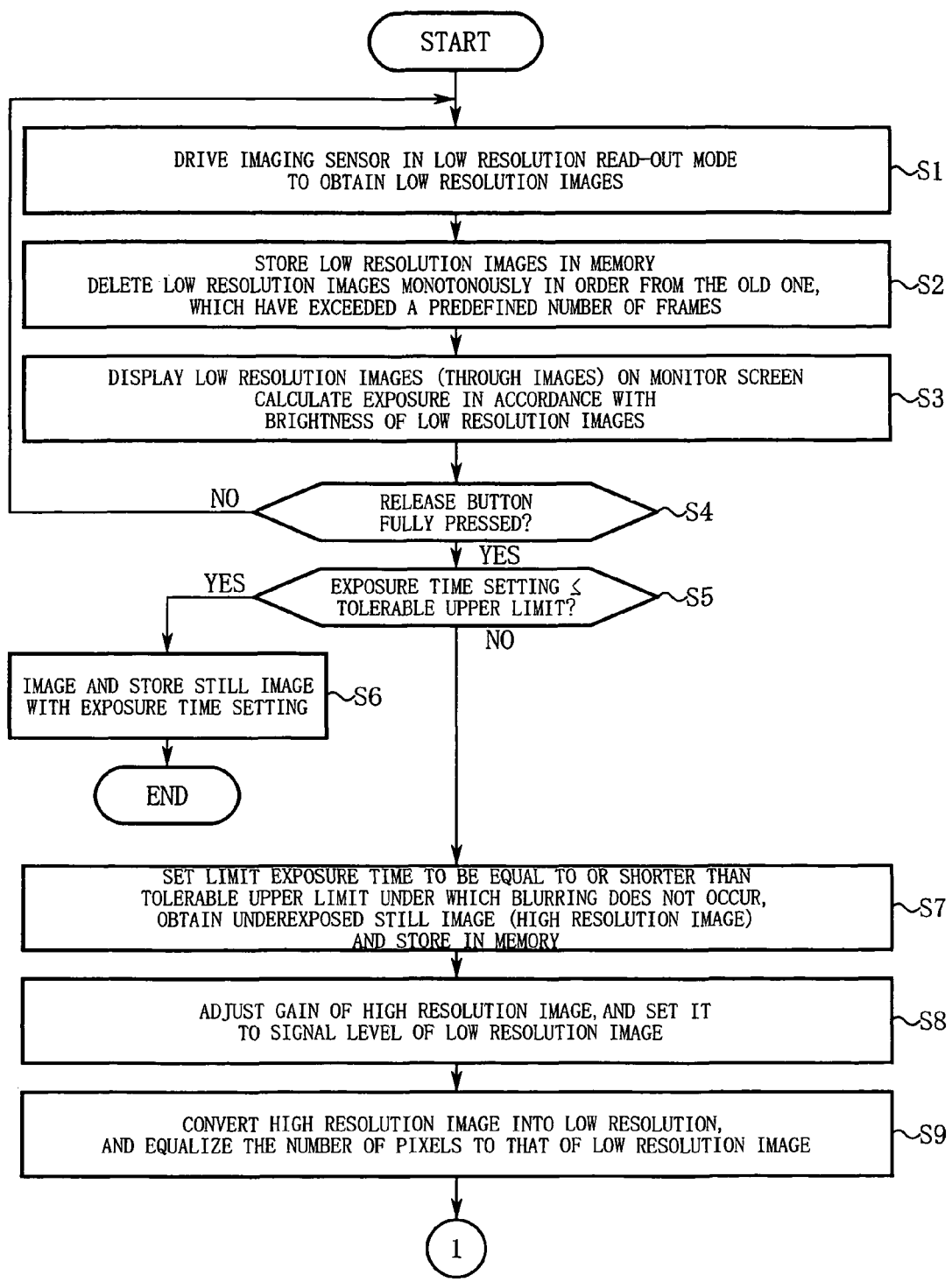
FIG. 3 is a flow chart describing the operation of the electronic camera 10 in the first embodiment.
Figure 4:
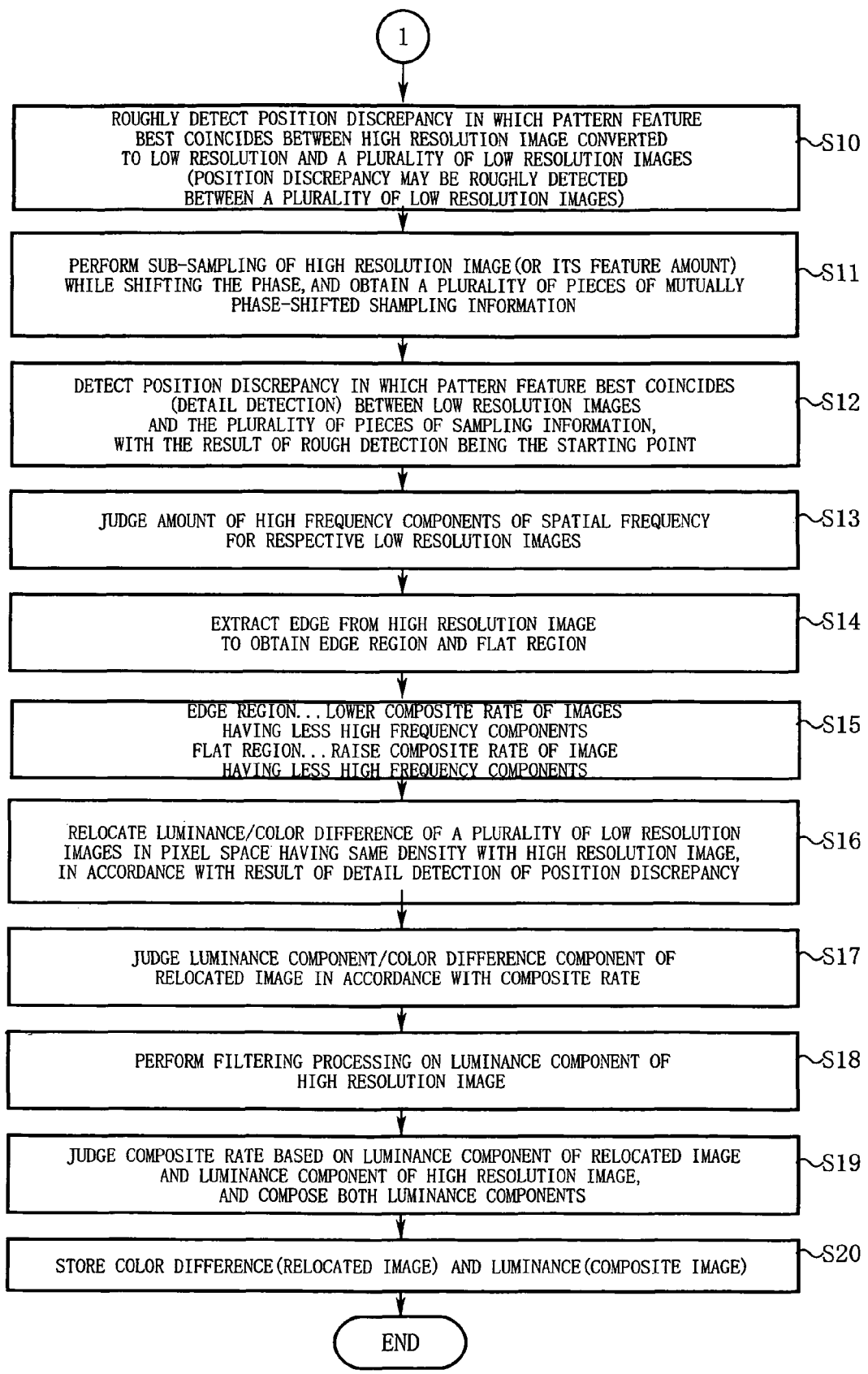
FIG. 4 is a flow chart describing the operation of the electronic camera 10 in the first embodiment.

FIGS. 3 and 4 are flow charts describing the operation of the electronic camera 10. Referring to the step numbers shown in FIG. 3, the operation will be described below.

Figure 5:
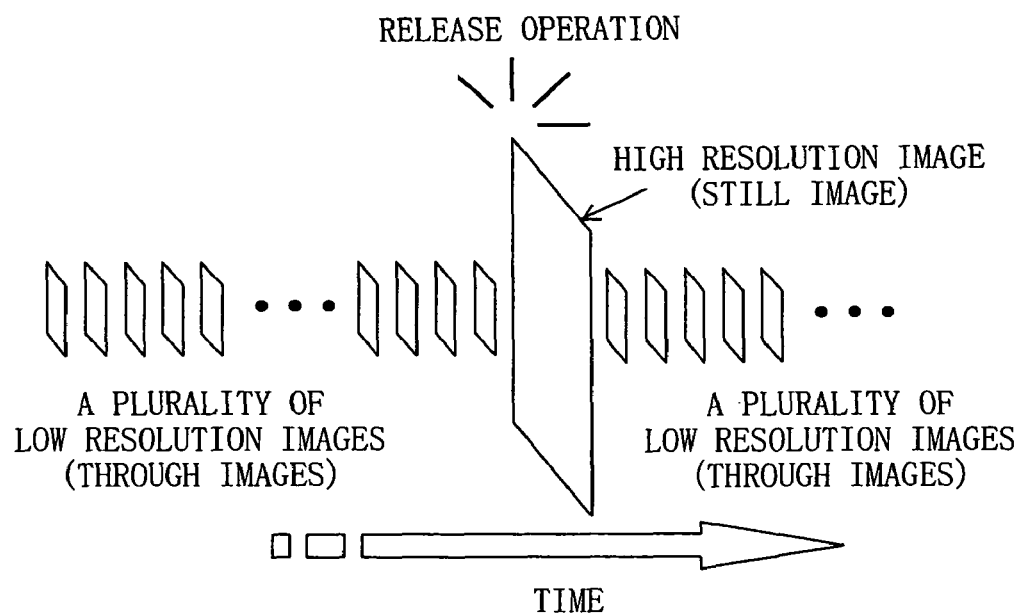
FIG. 5 is an explanatory view of low resolution images and a high resolution image.

Step S1: Upon activation of the main power source of the electronic camera 10, the microprocessor 19 instructs the imaging control section 14 to read out low resolution images. The imaging control section 14 drives the imaging sensor 11 with the low resolution read-out mode, and sequentially reads out low resolution images at 30 frames/second, for example, as shown in FIG. 5.

Step S2: The low resolution images read out from the imaging sensor 11 are temporarily stored in the memory 17 after having been processed via the signal processing section 15 and the A/D converter 16. Meanwhile, the microprocessor 19 deletes the low resolution images, which have exceeded a predefined number of frames in the memory 17, in order from the oldest one.

The predefined number of frames mentioned here corresponds to the number of frames of the low resolution images used for composing relocated images described below, and is preferably set equal to or larger than the (number of pixels of the high resolution image/number of pixels of the low resolution image).

For example, when the number of vertical and horizontal pixels of the low resolution images are respectively set to be ¼ of the number of vertical and horizontal pixels of the high resolution image, it is preferable to set the predefined number of frames equal to or larger than 4×4=16.

Step S3: The monitor display section 30 displays the low resolution images (through images) on the monitor screen. On the other hand, the microprocessor 19 calculates the exposure based on photometry result of the photometry section (not shown) or brightness of the low resolution images, and judges the exposure time of the high resolution image.

Step S4: Here, the microprocessor 19 judges whether or not the release button is fully pressed by the user.

When the release button is fully pressed, the microprocessor 19 shifts the operation to step S5. On the other hand, when the release button is not fully pressed, the microprocessor 19 returns the operation to step S1.

Step S5: Here, the microprocessor 19 judges whether or not the exposure time setting of the high resolution image determined in step S3 is equal to or shorter than a tolerable upper limit within which blurring is not outstanding. For example, the tolerable upper limit is set around 1/(focal length in terms of 35 mm size of imaging lens 12) second.

When the exposure time setting is equal to or shorter than the tolerable upper limit, the microprocessor 19 shifts the operation to step S6. On the other hand, when the exposure time setting exceeds the tolerable upper limit, the microprocessor 19 shifts the operation to step S7.

Step S6: The imaging control section 14 shutter-controls the imaging sensor 11 in accordance with the set exposure time. Subsequently, the imaging control section 14 drives the imaging sensor 11 with a high resolution read out mode and reads out the high resolution image. The high resolution image (still image) is recorded in a recording medium 22a after having gone through image processing and image compression as with the prior art. After this operation, the electronic camera 10 completes the imaging operation.

Step S7: When, on the other hand, it is judged that the exposure time setting exceeds the tolerable upper limit of blurring, the microprocessor 19 limits the exposure time to be equal to or shorter than the tolerable upper limit within which blurring does not occur.

The imaging control section 14, shutter-controls the imaging sensor 11 in accordance with exposure time which has been limited to be short. In such a condition, the imaging control section 14 drives the imaging sensor 11 with a high resolution read-out mode, and reads out a high resolution image. Although this high resolution image has a low signal level caused by underexposure, it is an image with little possibility of blurring. The high resolution image is temporarily recorded in the memory 17.

Step S8: The gain correcting section 31 in the image processing device 25 reads the high resolution image from the memory 17. By adjusting the gain of the high resolution image, the gain correcting section 31 adjusts its signal level to that of the low resolution images.

Step S9: The reduced image creating section 32 converts the resolution of the high resolution image after gain adjusting, and adjusts the number of pixels to that of the low resolution images.

For example, the number of vertical and horizontal pixels of the high resolution image can be respectively reduced to a resolution conversion of ¼, by extracting the mean value of 4×4 pixels.

Thus, a high resolution image which has been converted to low resolution (hereafter referred to as a reduced image) is transmitted to the feature quantity extracting section 35.

Figure 6:
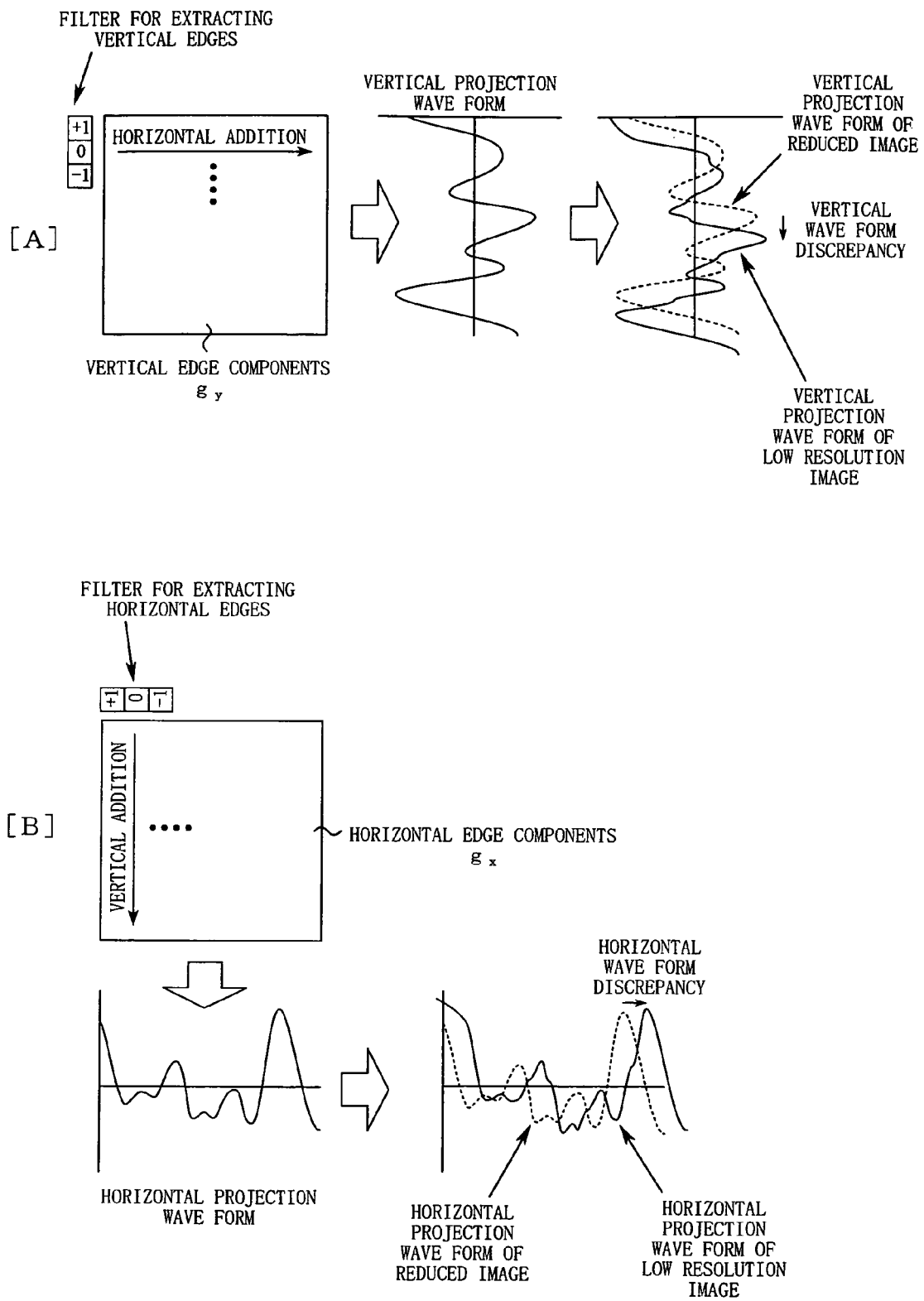
FIGS. 6[A] and 6[B] illustrate how image discrepancy is detected by comparing projection edges.

Step S10: FIGS. 6[A] and 6[B] are views describing detection of image discrepancy by comparing projection edges. Referring to FIGS. 6[A] and 6[B], processing of image discrepancy detection will be described below.

First, the feature quantity extracting section 35 extracts vertical edge components $g_y$ from the reduced image f(x, y) using a filter for extracting vertical edges (refer to FIG. 6[A]) represented by the following equation.

$$g_y(x,y)=-f(x,y-1)+f(x,y+1)$$

Furthermore, the feature quantity extracting section 35 extracts horizontal edge components $g_x$ from the reduced image f (x, y) using a filter for extracting horizontal edges (refer to FIG. 6[B]) represented by the following equation.

$$g_x(x,y) = -f(x-1,y) + f(x+1,y)$$

Meanwhile, in order to reduce the effect of noise, it is preferred that the feature quantity extracting section 35 substitutes zero for the vertical edge components $g_y$ and horizontal edge components $g_x$ that falls within a predefined small amplitude.

Next, as shown in FIG. 6[A], the feature quantity extracting section 35 calculates the vertical projection wave form by performing cumulative addition of the vertical edge components $g_y$ for a unit of horizontal row.

Furthermore, the feature quantity extracting section 35 calculates, as shown in FIG. 6[B], the horizontal projection wave form by performing cumulative addition of the horizontal edge components $g_x$ for a unit of vertical column.

On the other hand, the feature quantity extracting section 39 reads a plurality of low resolution images from the memory 17. The feature quantity extracting section 39 performs the same processing as that of the feature quantity extracting section 35 on individual low resolution images, and calculates the vertical projection wave form and the horizontal projection wave form respectively.

Here, by shifting the vertical projection wave form of the central region of the reduced image and the vertical projection wave form of the central region of the low resolution images, the rough detecting section 36 obtains the difference therebetween and detects the wave form discrepancy that provides the minimum absolute value of the sum of the difference, as shown in FIG. 6[A]. The wave form discrepancy is equivalent to the position discrepancy in the vertical direction of the reduced image and the low resolution images.

Additionally, as shown in FIG. 6[B], by shifting the horizontal projection wave form of the central region of the reduced image and the horizontal projection wave form of the central region of the low resolution images, the rough detecting section 36 obtains the difference therebetween and detects the wave form discrepancy that provides the minimum absolute value of the sum of the difference. The wave form discrepancy is equivalent to the position discrepancy in the horizontal direction of the reduced image and the low resolution images.

In this manner, the rough detecting section 36 obtains the position discrepancy (rough detection result) of a plurality of low resolution images, respectively, with the reduced image as the position reference, and outputs the position discrepancy to the detail detecting section 38.

Step S11: The feature quantity extracting section 33 reads the gain-compensated high resolution image and extracts vertical edge components $g_y$ and horizontal edge components $g_x$, using the edge extraction filter.

Here, it is preferred that the extraction filter is switched as described below according to the read out system of the low resolution images.

when the low resolution images are generated by adding or averaging pixels $$g_y(x,y) = [-f(x,y-4)-f(x,y-3)-f(x,y-2)-f(x,y-1)+f(x,y+4)+f(x,y+5)+f(x,y+6)+f(x,y+7)]/4$$

$$g_x(x,y) = [-f(x-4,y)-f(x-3,y)-f(x-2,y)-f(x-1,y)+f(x+4,y)+f(x+5,y)+f(x+6,y)+f(x+7,y)]/4$$

when low resolution images are generated by thinning for pixels $$g_y(x,y) = -f(x,y-4) + f(x,y+4)$$

$$g_x(x,y) = -f(x-4,y) + f(x+4,y)$$

Meanwhile, in order to reduce the effect of noise, it is preferred that the feature quantity extracting section 33 substitutes zero for the vertical edge components $g_y$ and horizontal edge components $g_x$ that fall within a predefined small amplitude.

Next, the feature quantity extracting section 33 calculates the vertical projection wave form by performing cumulative addition of the vertical edge components $g_y$ for a unit of horizontal row. Additionally, the feature quantity extracting section 33 calculates the horizontal projection wave form by performing cumulative addition of the horizontal edge components $g_x$ for a unit of vertical column.

Figure 7:
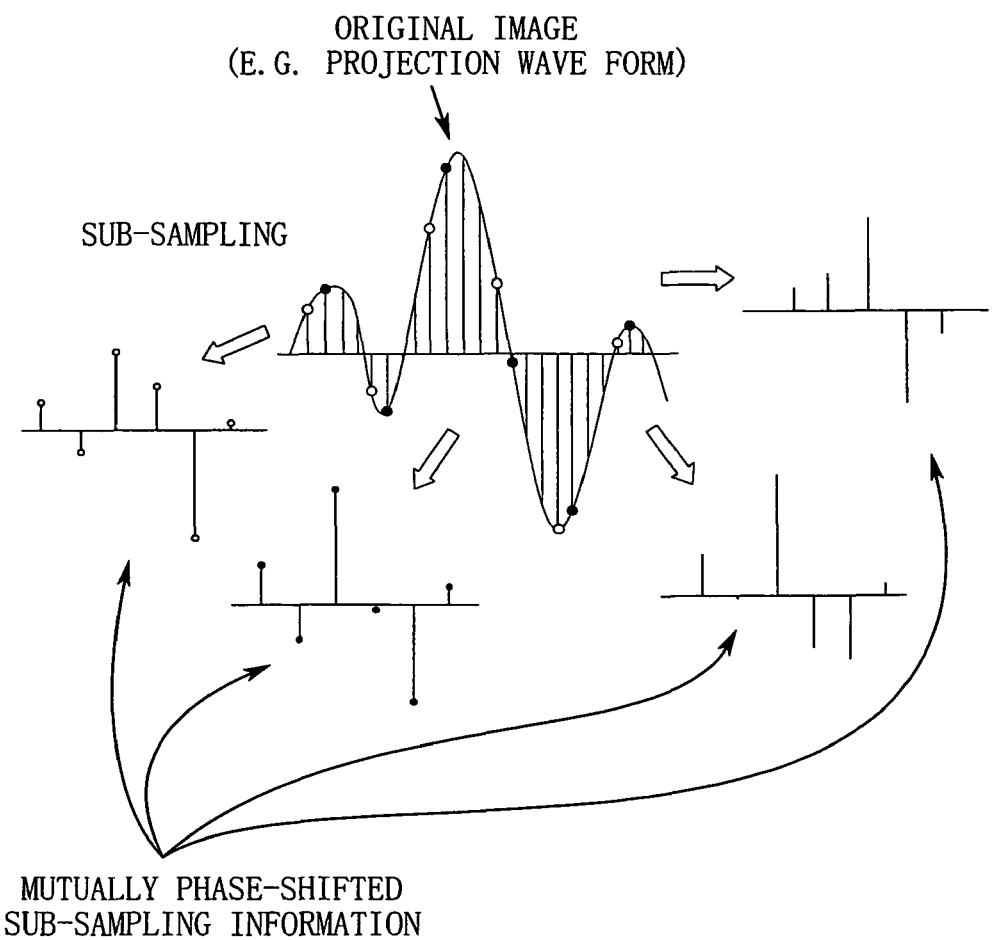
FIG. 7 illustrates how sub-sampling is performed.

The phase dividing section 37 performs sub-sampling in every four pixels of the vertical projection wave form of the high resolution image. The phase dividing section 37 generates four types of mutually phase-shifted sampling information as shown in FIG. 7 by shifting phases of sub-sampling.

Similarly, the phase dividing section 37 performs sub-sampling in every four pixels of the horizontal projection wave form of the high resolution image. In this occasion, the phase dividing section 37 generates four types of mutually phase-shifted sampling information by shifting phases of sub-sampling.

Step S12: By shifting the sampling information of the vertical projection wave form obtained from the high resolution image and the vertical projection wave form of the low resolution images, with the detection result of the position discrepancy detected by the rough detecting section 36 as the starting point, the detail detecting section 38 obtains the difference therebetween and detects the wave form discrepancy that provides the minimum absolute value of the sum of the difference.

The detail detecting section 38 finds the wave form discrepancy with which feature of the patterns (wave form, here) best coincides, by detecting the wave form discrepancy for each of the four types of sampling information. The wave form discrepancy corresponds to the position discrepancy of the horizontal direction in units smaller than pixel distances of the low resolution images.

Furthermore, the detail detecting section 38 similarly detects the vertical position discrepancy in units smaller than pixel distances of the low resolution images (for example, a unit of pixel distance of the high resolution image).

In this manner, the detail detecting section 38 finds the position discrepancy (detail detection result) of a plurality of low resolution images, respectively, with the high resolution image as the position reference, and outputs the position discrepancy to the image composition section 34.

Step S13: The image composition section 34 performs high-pass filtering on the low resolution images and calculates the absolute value of the sum of the filtering result to find the amount of high frequency components. According to the amount of the found high frequency component, a plurality of low resolution images are sorted.

Figure 8:
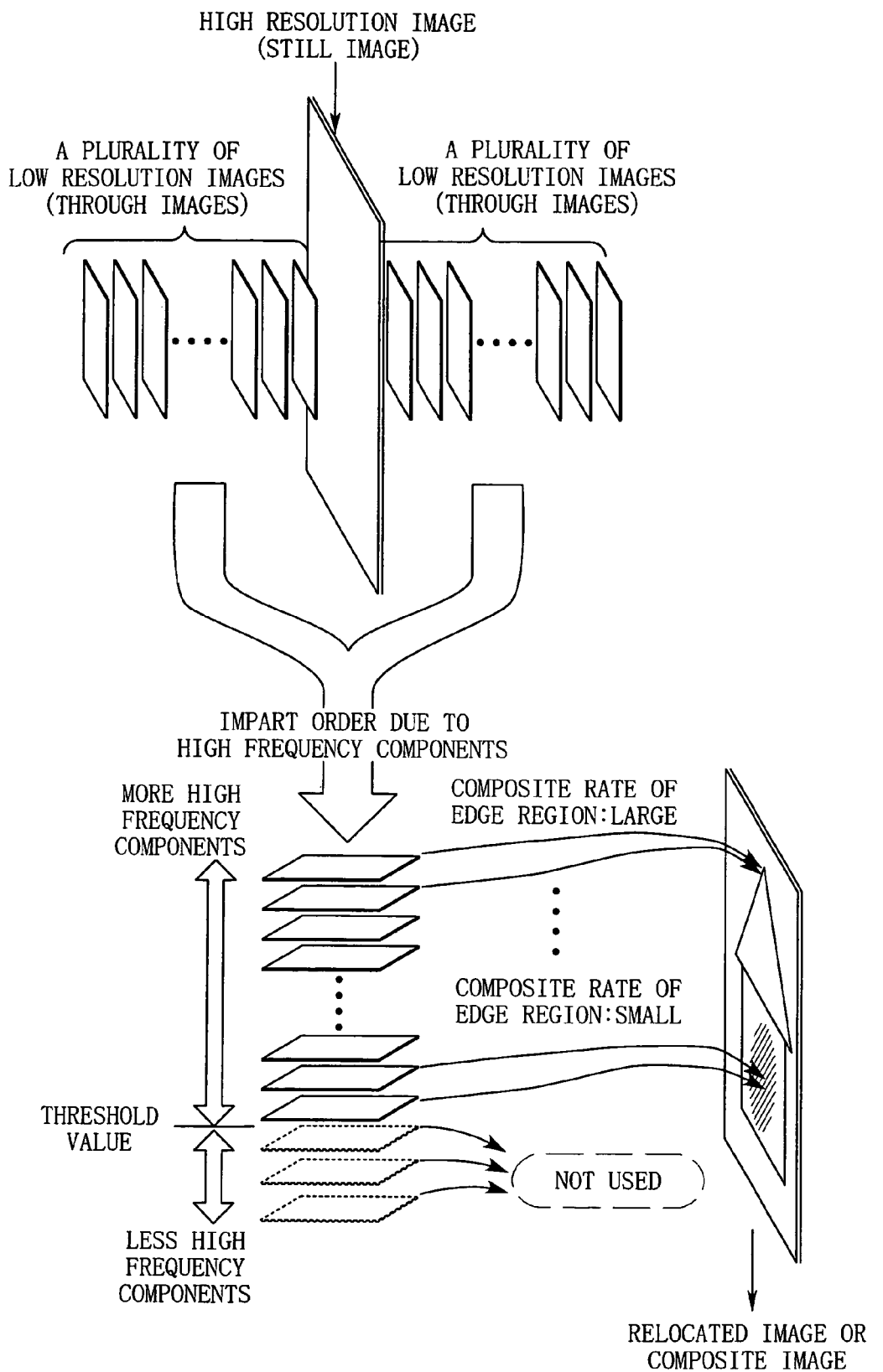
FIG. 8 illustrates the adjustment operation of composite rate.

Meanwhile, as shown in FIG. 8, the images from the high order to predetermined order may be discriminated while imparting order to images in descending order of the amount of high frequency components, and those may be images to be used for composition. In addition, images having an amount of high frequency components exceeding a predefined threshold value may be selected as the images to be used for composition.

With such discrimination processing, images whose high frequency components do not satisfy the criterion caused by a large amount of blurring quantity, or the like, can be suitably excluded from the composition processing. As a result, quality of the image after composition can certainly be enhanced.

Step S14: The image composition section 34 performs high-pass filtering on a high resolution image and divides the high resolution image into an edge region and a flat region according to the result of filtering.

Step S15: In the edge region obtained in step S14, the composite rate is lowered progressively for images having less high frequency components. On the other hand, in the flat region obtained in step S14, the composite rate of an image having less high frequency components is raised to be higher than the edge part. Meanwhile, for a region which is neither an edge region nor a flat region, provided is an intermediate composite rate of both regions.

Step S16: The image composition section 34 magnifies (4×4 times) a plurality of low resolution images respectively. In this occasion, the image composition section 34 obtains a magnified image with a widened pixel distance, without performing pixel interpolation.

Figure 9:
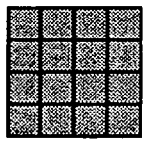
FIG. 9 is an explanatory view of the operation of generating relocated images.
Figure 9:
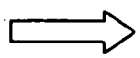
Figure 9:
Figure 9:
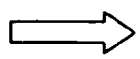
Figure 9:
Figure 9:
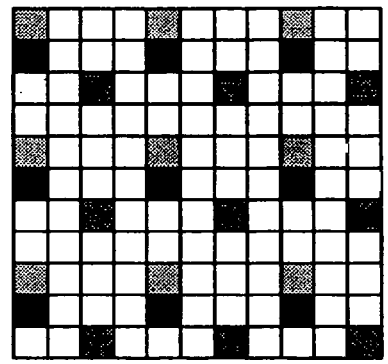

Next, the image composition section 34 performs mapping (relocation) as shown in FIG. 9 by shifting the pixel positions of the magnified image of the low resolution images respectively based on the detail detection result of the position discrepancy obtained by the detail detecting section 38.

In this manner, relocated images having the approximately same number of vertical and horizontal pixels as the high resolution image can be obtained.

Step S17: In the relocated images after having been completed the mapping processing, there are pixels having unfilled gaps, pixels displaced from the normal pixel position, and overlapping pixels.

The image composition section 34 picks up neighboring pixels for each normal pixel position of the relocated images. The image composition section 34 executes a weighted averaging on the signal components of these neighboring pixels, in accordance with the composite rate which has been set in step S15. The image composition section 34 sets the value of the weighted average to the signal components (luminance/color difference component, etc.) of the normal pixel position. By such a composition processing, relocated images having the same number of vertical and horizontal pixels as the high resolution image can be obtained.

Meanwhile, instead of the above-mentioned weighted averaging, the relocated images may be composed by calculating the median of signal components of neighboring pixels.

Step S18: The image composition section 34 executes filtering on the luminance components of the high resolution image as described below.

First, the image composition section 34 extracts luminance components from the high resolution image after gain correction, and performs filtering which is a combination of median calculation and Gaussian filtering. For example, the filter size may be set to 3×3 pixels, and three middle values are extracted from the nine pixels in the filter size to perform Gaussian filtering. With this processing, noise portion included in underexposed luminance components can be preliminarily reduced.

Step S19: Next, composite rate is set between luminance components A of the high resolution image after filtering and luminance components B of the relocated images.

Here, it is preferable to set the composite rate in accordance with rules such as those described below.
(1) The larger is a signal difference existing between the luminance components A of the high resolution image and luminance components B of the relocated images, the more the composite rate of the relocated images is locally reduced.
(2) The larger is a local signal variation at portions where the luminance components A of the high resolution image exists, the more the composite rate of the relocated images is locally reduced.
(3) The smaller is the time interval between the high resolution image and the low resolution images; the more the composite rate of the luminance components B of the relocated images is generally raised.
(4) The smaller is the position discrepancy between the high resolution image and the low resolution images, the more the composite rate of the luminance components B of the relocated images is generally raised.

Meanwhile, to be specific, it is preferable to use the following Gaussian filter for calculating the luminance components g (i, j) of composite image.

$$g(i, j) = \frac{\left[\sum_{k=1}^{m}\sum_{l=1}^{m}\{G(k, l, A(i, j))B(i-(m-1)/2+k-1, j-(m-1)/2+l-1)\} + A(i, j)\right]}{\left\{\sum_{k=1}^{m}\sum_{l=1}^{m}G(k, l, A(i, j)) + 1\right\}}$$ [equation 1]

$$G(i, j) = \exp\left[-\frac{(p - B(i, j))^2}{2\sigma^2}\right]$$

In the above equation, two stages of processing will be performed. That is, Gaussian filtering (smoothing) with m=5, for example, is performed on the luminance components B of the relocated images. Next, the result of smoothing of the luminance components B is composed with a weight for the luminance components A of the high resolution image in each pixel unit.

In this occasion, the larger is the signal difference between the luminance components A and B, the more the composite rate G (i,j,p) of the luminance components B decreases. As a result, the luminance components A of the high resolution image are locally prioritized at portions where patterns are largely different between the high resolution image and the relocated images.

Meanwhile, it is preferred that the composite rate G (i,j,p) is not particularly changed depending on the reference distance of pixels. Thus luminance components B within the filter size m can be reflected in the luminance components A, even if the reference distance is far. As a result, mis-positioning of the relocated images can be tolerated to a certain extent.

In addition, σ in the above equation is a numeric value for adjusting the value of the composite rate or the range of reduction. The larger at portions where the variance of the neighboring 3×3 pixels of the luminance components A is, the smaller this σ is preferably set locally. As thus described, the composite rate of the relocated images locally decreases in the vicinity of edges of the high resolution image, by reducing σ locally. As a result, effects (smoothing and distortion) on the image structure such as edges can be suppressed.

Meanwhile, it is preferred that σ in the above equation is progressively set larger when time interval and/or position discrepancy between the high resolution image and the low resolution images becomes smaller. As thus described, the composite rate of the relocated images is generally raised progressively, if patterns of the high resolution image and the low resolution images are estimated to be closer, by allowing σ to be varied. As a result, information of the relocated images (low resolution images) having closer patterns can be reflected in the composite image with a higher priority.

Step S20: The color difference components of the relocated images generated in step S17 and the luminance components of the composite image generated in step S19 are combined to generate a high resolution color image having information of the low resolution images reflected therein.

This color image is recorded in the recording medium 22a via the image compression section 24 and the recording section 22, or the like.

Effects of Present Embodiment

The present embodiment effectively uses the through images (low resolution images), which will be discarded after being displayed on the monitor, for enhancing image quality of the still image (high resolution image). By effectively using the through images, imaging performance of the electronic camera 10 can be enhanced.

In addition, low resolution images with a short imaging time interval is composed in the present embodiment. Therefore, the difference of patterns between images is inherently small, whereby a good image composition result can be obtained.

Further, in the present embodiment, positioning of a plurality of low resolution images is performed, with the high resolution image having a high pixel density as the position reference. Therefore, precision of the pattern positioning of low resolution images is high, whereby a better image composition result can be obtained.

Additionally, in the present embodiment, a plurality of sampling information with mutually shifted sampling phases is generated from the high resolution image. Position discrepancy can be detected in units smaller than pixel distances of the low resolution images by detecting position discrepancy between the sampling information and the low resolution images, respectively. Therefore, precision of pattern positioning of the low resolution images can be further raised, whereby a still better image composition result can be obtained.

Furthermore, in the present embodiment, luminance components of a higher resolution than the low resolution images can be obtained by positioning and mapping the luminance components (signal components of high visual sensitivity) of a plurality of low resolution images.

Additionally, in the present embodiment, color difference components having a higher resolution than the low resolution images can also be obtained by positioning and mapping the color difference components (signal components of low visual sensitivity) of a plurality of low resolution images.

Furthermore, in the present embodiment, the high resolution luminance components (relocated images) generated by positioning are composed with a weight with the luminance components of the original high resolution image. By this composition with a weight, luminance noise having no correlation between both images can be suppressed. As a result, S/N of the high resolution image in an underexposed condition (see step S7) can be improved.

Additionally, in the present embodiment, the composite rate of the relocated images is locally reduced when the signal difference between the high resolution image and the relocated images is significantly large. As a result, when occurring mis-positioning in the relocated images, the signal difference between both images significantly widens and the composite rate of the relocated images decreases. Therefore, the mis-positioning will not be significantly reflected in the image composition result.

Furthermore, in the present embodiment, the composite rate of the relocated images is locally reduced at portions where a larger local signal variation of the high resolution image exists. Therefore, the image structure of the high resolution image is given a higher priority, in the edge part of the image or the like. As a result, adverse effects such that an edge seems to have multiple lines can be avoided.

Additionally, in the present embodiment, the smaller is the time interval and/or position discrepancy between the high resolution image and the low resolution images, the more the composite rate of the relocated images is generally raised. When such a condition is satisfied, patterns of the high resolution image and the low resolution images are estimated to be very close. Therefore, image S/N can be further raised without possible distortion of patterns by raising the composite rate of the relocated images.

Meanwhile, in the present embodiment, as shown in FIG. 8, a plurality of low resolution images are sorted in the order of the amount of high frequency components of spatial frequency. In this occasion, images having less high frequency components caused by outstanding blurring are excluded from the images to be used for composition.

Furthermore, for images which are selected to be used for composition but are judged to have relatively less high frequency components, their composite rate of positioning composition in the edge part of the pattern is adjusted to be smaller. As a result, positioning composition is performed with a higher priority given to the edge part in images having little hand shake or object blurring. Accordingly, adverse effects such as blurring of an edge part of a relocated image can be suppressed.

Additionally, in the present embodiment, the composite rate of the flat part is increased in comparison with the edge part for images which are judged to have less high frequency components. As a result, positioning composition of a plurality of images is performed more uniformly in the flat part, whereby image S/N after the positioning composition can be raised.

Description of Second Embodiment

Figure 10:
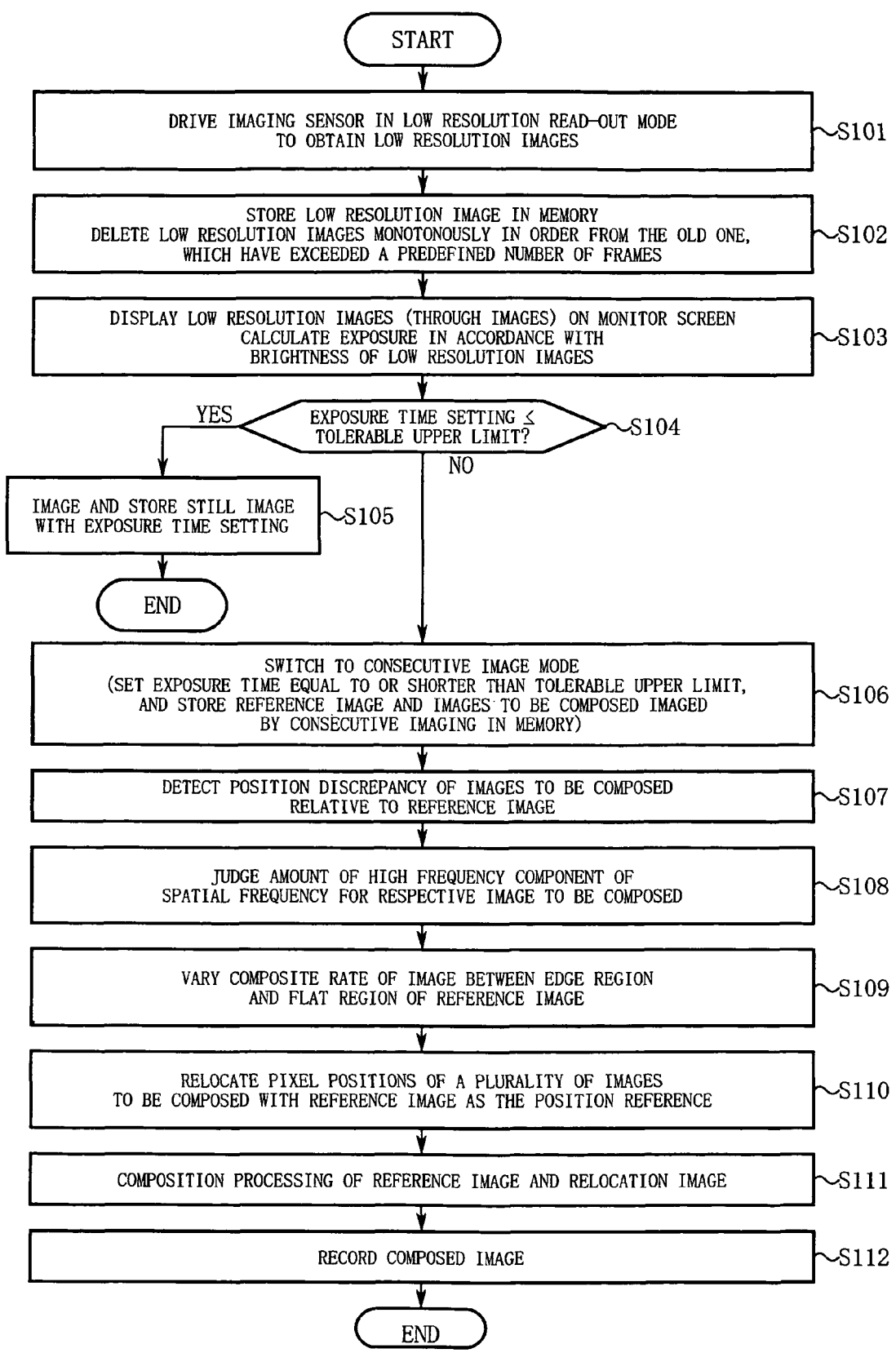
FIG. 10 is a flow chart describing the operation of the electronic camera 10 in the second embodiment.
Figure 11:
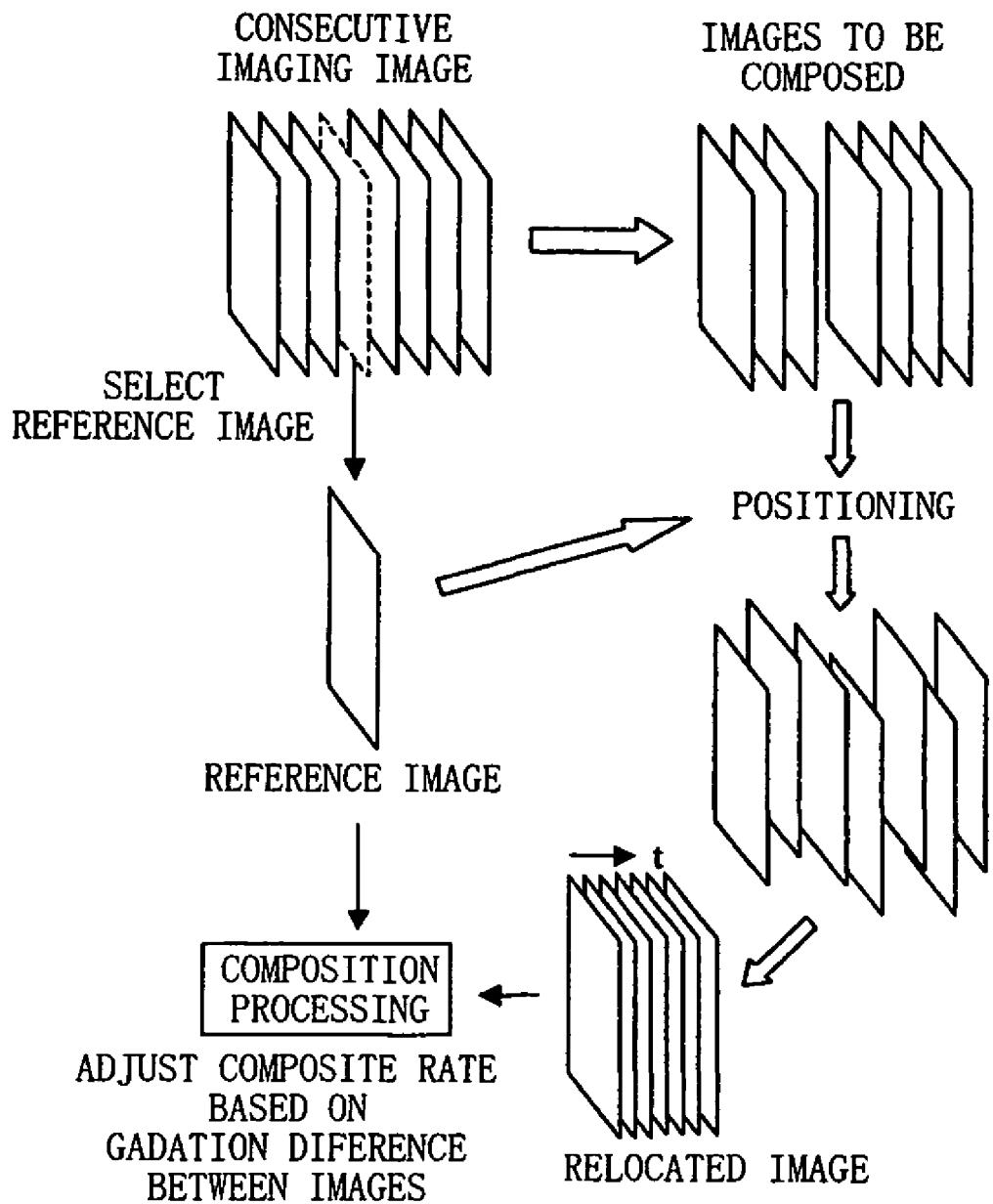
FIG. 11 is a schematic view showing the image composition processing in the second embodiment.

FIG. 10 is a flow chart describing the operation of the electronic camera 10 in the second embodiment. In addition, FIG. 11 is a schematic view showing the composition processing of an image in the second embodiment.

Here, the second embodiment is a modified example of the first embodiment, wherein the electronic camera composes a plurality of images with the same resolution. In addition, since the configuration of the electronic camera in the second embodiment is common to the electronic camera of the first embodiment (FIG. 1), duplicative description is omitted.

Furthermore, since steps S101 to S103 of FIG. 10 correspond to S1 to S3 of FIG. 3, respectively, duplicate description is omitted. Operation of the electronic camera will be described below, along the step numbers shown in FIG. 10.

Step S104: Here, the microprocessor 19 judges whether or not the exposure time setting of the high resolution image determined in step S103 is equal to or shorter than the tolerable upper limit within which blurring is not outstanding. Meanwhile, the tolerable upper limit is set in the same way as the above step S5.

When the exposure time setting is equal to or shorter than the tolerable upper limit, the microprocessor 19 shifts the operation to step S105. On the other hand, when the exposure time setting exceeds the tolerable upper limit, the microprocessor 19 shifts the operation to step S106.

Step S105: The imaging control section 14, shutter-controls the imaging sensor 11 in accordance with exposure time being set, and images a high resolution image (still image). Meanwhile, since the operation of this step corresponds to step S6, duplicate description is omitted.

Step S106: On the other hand, when it is judged that the exposure time setting exceeds the tolerable upper limit of blurring, the microprocessor 19 switches the operation state of the electronic camera to a consecutive imaging mode. Then, the microprocessor 19 limits the exposure time of each frame in the consecutive imaging mode to be shorter than the tolerable upper limit within which blurring does not occur.

The imaging control section 14 in the consecutive imaging mode drives the imaging sensor 11 in high resolution read-out mode in accordance with the exposure time limited to be short. In this manner, a plurality of high resolution images will be consecutively imaged by the imaging sensor 11. Although respective high resolution images have a low signal level caused by underexposure, they are images with little possibility of blurring. The above-mentioned high resolution images are temporarily recorded in the memory 17 respectively.

Here, in the above-mentioned consecutive imaging mode, imaging will be performed in accordance with the following (1) or (2), for example.

(1) The imaging control section 14 starts consecutive imaging of the high resolution image from the time point of switching to the consecutive imaging mode, and accumulates high resolution images for a certain time period in the memory 17. In this occasion, the microprocessor 19 deletes the high resolution images monotonously in order from the old one, which have exceeded a predefined number of frames in the memory 17.

Then, upon accepting the user's instruction (pressing of the release button, etc.) during consecutive imaging, the microprocessor 19 specifies an image which corresponds to the timing of the above-mentioned instruction as being the reference image, among the high resolution images in the memory 17. In addition, the microprocessor 19 specifies a predefined number of continual high resolution images in the time axis direction for the reference image, as targets of composition processing described below. In the second embodiment, a high resolution image specified as the target of composition processing is referred to as an image to be composed. Meanwhile, the reference image and the images to be composed are kept in the memory 17 at least until the composition processing is completed.

(2) In response to the user's instruction (pressing on the release button, etc.) to start the consecutive imaging, the microprocessor 19 causes the imaging control section 14 to start the consecutive imaging. Then, the microprocessor 19 either accepts the user's instruction (releasing on the release button, etc.) to stop the consecutive imaging, or, when consecutive imaging of a predefined number of frames has been completed, stops the above-mentioned consecutive imaging.

Subsequently, the microprocessor 19 displays the imaged images on the monitor display section 30 respectively, and causes the user to select a reference image. Then, the microprocessor 19 sets an image specified by the user among the high resolution images which have been consecutively imaged to the recording image. In addition, the microprocessor 19 sets images other than the reference image among the high resolution images which have been consecutively imaged to the images to be composed.

Meanwhile, the microprocessor 19 may specify an image corresponding to the timing of the instruction that starts the consecutive imaging (the high resolution image imaged first) as the reference image, in case (2). In this case, it is possible to omit the process of letting the user specify the reference image.

Step S107: The image processing device 25 detects discrepancy of the images to be composed (S106) relative to the reference image (S106) by the same processing as step S10 of the first embodiment. Meanwhile, detection of such image discrepancy is performed on all of the images to be composed.

Step S108: The image composition section 34 of the image processing device 25 performs high-pass filtering on the images to be composed (S106), and calculates the absolute value of the sum of the result of filtering to find the amount of high frequency components. Then, the image composition section 34 sorts a plurality of the images to be composed in accordance with the found amount of high frequency components.

In this occasion, like the first embodiment, the image composition section 34 may discriminate the images from the high order to predetermined order while imparting order to images in descending order of the amount of high frequency components, to narrow down the images which will be actually used for composition from among the images to be composed. In addition, the image composition section 34 may select images having an amount of high frequency components exceeding a predefined threshold value to narrow down the images to be composed to those which will be actually used for composition.

Step S109: The image composition section 34 performs high-pass filtering on the reference image, and region-divides the reference image into an edge region and a flat region based on the result of filtering. Then, the image composition section 34 progressively minimizes the composite rate of images to be composed having less high frequency components, in the edge region of the reference image. On the other hand, the image composition section 34 raises the composite rate of images having less high frequency components in the flat region of the reference image than the edge part. Meanwhile, for region which is neither an edge region nor a flat region, an intermediate composite rate of both regions is set.

Step S110: The image composition section 34 performs mapping (relocation) by displacing the pixel positions of the images to be composed respectively (referring to FIG. 11), based on the detection result of position discrepancy obtained in S107, with the reference image as the position reference. In the second embodiment, an image to be composed after mapping is referred to as a relocated image.

In the second embodiment, resolution (number of pixels) of the reference image and respective images to be composed is the same. Therefore, as shown in FIG. 11, the group of relocated images is treated as three dimensional images having a time axis t in addition to x axis and y axis which indicate the position within the same image.

Step S111: The image composition section 34 performs a composition processing of the reference image (S106) and the relocated images (S110) to generate the final composite image.

Here, the image composition section 34 sequentially composes respective relocated images for the reference image, repeating the composition processing as many times as the number of the relocated images. Meanwhile, the image composition section 34 may preliminarily compose a plurality of relocated images by median calculation or the like, then compose the preliminarily composed relocated images with the reference image.

The composition processing in S111 will be specifically described below. First, the image composition section 34 reads out the initial value of the composite rate obtained in S109. Then, the image composition section 34 further adjusts the composite rate of the reference image and the relocated images, while paying attention to the gradation value of the reference image and the gradation value of the relocated images.

For example, when difference of gradation values between a target pixel of the reference image and a target pixel of the relocated image is equal to or larger than a threshold value (case of a large gradation difference), the image composition section 34 locally reduces the composite rate at the target pixel. On the other hand, when difference of gradation values between a target pixel of the reference image and a target pixel of the relocated image is smaller than a threshold value (case of small gradation difference), the image composition section 34 locally raises the composite rate at the target pixel. In this manner, adverse effects caused by mis-positioning between the images can be significantly suppressed.

In addition, the image composition section 34 adjusts the composite rate in accordance with the local signal variation on the reference image. For example, the image composition section 34 locally reduces progressively the composite rate for the relocated images at portions where a larger local signal variation on the reference image exists. In addition, the image composition section 34 locally raises the composite rate for the relocated images at portions where the local signal variation on the reference image is small. In this manner, adverse effects such that an edge on the composite image seems to have multiple lines can be suppressed.

Second, the image composition section 34 composes the reference image and the relocated images by adding respective pixels corresponding thereto, in accordance with the composite rate. It is assumed in S111 that the image composition section 34 finds the luminance components and the color difference components of each pixel respectively in the composition processing. In this manner, a high resolution color image will be generated, having information of a plurality of images to be composed reflected therein.

Step S112: The microprocessor 19 records the final composite image (generated in S111) in the recording medium 22a, via the image compression section 24 and the recording section 22 or the like. Description of FIG. 10 has thus been completed.

The configuration of the second embodiment can also achieve a similar effect as with the first embodiment. Particularly, since the resolution of the relocated images is high with a large amount of information in the second embodiment, a further fine color image can be obtained.

Supplementary Notes of Embodiments (1) The inventors have disclosed, in Japanese Unexamined Patent Application No. 2005-345715, a procedure of further speeding up detection of position discrepancy. In accordance with this procedure, detection of position discrepancy by each of the above-mentioned embodiments may be speeded up.

(2) In step S10, absolute position discrepancy between the reduced image of the high resolution image and the low resolution images is roughly detected. However, the present invention is by no means limited to such a configuration. Relative position discrepancy between a plurality of low resolution images may be roughly detected. Based on this relative rough detection result and at least one of the results of detail detection of position discrepancy, the detail detecting section 38 can roughly recognize the remaining absolute position discrepancy. The detail detecting section 38 can quickly detect precise position discrepancy by searching position discrepancy using the absolute rough detection result as the starting point.

(3) In the above-mentioned embodiment, position discrepancy of images is detected by comparing projection wave forms. However, the present invention is by no means limited to such a configuration. For example, position discrepancy may be detected by spatial comparison of pixel arrangement of both images.

(4) In the first and second embodiments mentioned above, a case has been described in which the image processing device is mounted on the electronic camera. However, the present invention is by no means limited to such a configuration. An image processing program may be generated by translating the above-mentioned image processing into program codes. A high image quality and high resolution composition result can be generated on the computer by executing the image processing program on the computer and using the information of low resolution images in an effective manner. Similarly, when performing the image processing of the second embodiment on the computer, a high image quality and high resolution composition result can be generated on the computer by effectively using other images which have been consecutively imaged.

Here, when performing the image processing of the second embodiment on the computer, the user can specify any image among those which have been consecutively imaged as the reference image.

(5) In the above-mentioned first embodiment, a plurality of low resolution images are obtained before imaging the high resolution image. However, the present invention is by no means limited to such a configuration. A plurality of low resolution images may be obtained after imaging the high resolution image. In addition, a plurality of low resolution images may be obtained before and after imaging the high resolution image.

(6) In the above-mentioned first embodiment, color difference components are obtained from the relocated images and luminance components are obtained from the composite image. However, the present invention is by no means limited to such a configuration. Luminance components and color difference components may be obtained from the relocated images. Alternately, luminance components and color difference components may be obtained from the composite image. Meanwhile, in the second embodiment, it may be arranged such that luminance components are obtained from the reference images and the relocated images, and color difference components may be obtained from the relocated images, in the same way as the first embodiment.

(7) In the first and second embodiments mentioned above, a case has been described in which image signals of luminance color difference are handled. However, the present invention is by no means limited to such a configuration. Generally, the present invention may be applied to a case handling image signals such as RGB, Lab, or the like. In the case RGB image signals, signal components having high visual sensitivity are G components, whereas the remaining signal components are RB components. Additionally, in the case of Lab image signals, signal components having high visual sensitivity are L components, whereas the remaining signal components are ab components.

(8) In the first and second embodiments mentioned above, position discrepancy of patterns is detected by image processing. However, the present invention is by no means limited to such a configuration. For example, the camera may by equipped with an acceleration sensor or the like to obtain the movement (vibration) of the imaging region of the camera, and position discrepancy of patterns of a plurality of images may be detected from the movement (vibration) of the imaging region.

(9) In the first and second embodiments mentioned above, examples in which the image processing device is implemented in a general electronic camera have been described. However, it is needless to say that the image processing device of the present invention may be applied in combination with a monitoring camera, or a drive recorder system comprising a vehicle-installed camera for recording accident images, for example.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image processing device comprising:
   an image input section which reads a plurality of first resolution images of imaging a same object and at least one second resolution image of imaging the same object, the second resolution image having a higher resolution image than the first resolution images;
   a position discrepancy detecting section which detects position discrepancy of patterns between the respective first resolution images and the second resolution image; and
   an image composition section which positions and composes patterns for the plurality of first resolution images based on the position discrepancy.

2. The image processing device according to claim 1, wherein
   the position discrepancy detecting section comprises:
   a phase dividing section which performs sub-sampling of one of the second resolution image and its feature with its phase shifted and generates a plurality of pieces of mutually phase-shifted sampling information; and
   a detail detecting section which detects the position discrepancy in units smaller than pixel distances of the first resolution images by detecting the position discrepancy where a feature of patterns best coincides between the first resolution images and the plurality of pieces of sampling information.

3. The image processing device according to claim 1, wherein
   the position discrepancy detecting section comprises:
   a rough detecting section which detects position discrepancy of patterns between the plurality of first resolution images; and
   a detail detecting section which detects position discrepancy between the second resolution image and the first resolution images starting from the position discrepancy detected by the rough detecting section.

4. The image processing device according to claim 1, wherein
   the image composition section relocates and composes signal components of the plurality of first resolution images based on the position discrepancy, and generates a relocated images having higher resolution.

5. The image processing device according to claim 4, wherein
   the image composition section generates a composite image based on the second resolution image and the relocated images.

6. The image processing device according to claim 5, wherein
   the composite image is generated with a composite rate of the relocated images locally reduced at portions where a larger signal difference exists between the second resolution image and the relocated images.

7. The image processing device according to claim 5, wherein
   the composite image is generated with the composite rate of the relocated images locally reduced at portions where a larger local signal variation of the second resolution image exists.

8. The image processing device according to claim 5, wherein
   the composite image is generated with the composite rate of the relocated images generally raised progressively when one of a time interval and the position discrepancy between the second resolution image and the first resolution images is smaller.

9. The image processing device according to claim 5, wherein
   the image composition section generates the composite image for high visual-sensitivity signal components constituting a color image, and generates the relocated images for remaining first visual-sensitivity signal components.

10. An electronic camera comprising:
    the image processing device according to claim 1; and
    an imaging section which images an object with at least two types of resolution, wherein
    the second resolution image processed by the image processing device is a second resolution still image imaged with the imaging section, and
    the first resolution image processed by the image processing device is a first resolution image imaged with the imaging section one of before and after imaging the still image.

11. A non-transitory computer readable medium storing an image processing program capable of instructing a computer to function as the image processing device according to claim 1.

12. The image processing device according to claim 1, wherein
    the image composition section judges a high frequency components of spatial frequency for the plurality of first resolution images, and reduces the composite rate of a positioning composition in the edge part of the pattern having the less high frequency components.

13. The image processing device according to claim 12, wherein
    the image composition section raises the composite rate if the positioning composition in a flat part of the pattern to be higher than the composite rate of the edge part for the images which are judged of having the less high frequency components.

14. The image processing device according to claim 12, wherein
    the image composition section selects the images for use in the composition in accordance with the amount of the high frequency component.

15. An electronic camera comprising;
    the image processing device according to claim 12, and
    an imaging section which consecutively images objects and generates a plurality of first resolution images and second resolution images, the second resolution image having a higher resolution image than the first resolution images, wherein the electronic camera has a function of positioning and composing the plurality of first resolution images with the image processing device.

16. An image processing device comprising:
an image input section which reads a plurality of images of imaging a same object;
a position discrepancy detecting section which detects position discrepancy of patterns between the plurality of images; and
an image composition section which positions and composes the patterns of the plurality of images based on the position discrepancy, wherein
the image composition section judges magnitude of a local signal variation for a positioning reference image, and locally lowers the composite rate of other images at portions where the signal variation is judged to be large.

17. An electronic camera comprising:
the image processing device according to claim 16; and
an imaging section which consecutively images object and generates a plurality of images, wherein
the electronic camera has a function of positioning and composing the plurality of images with the image processing device.

18. A non-transitory computer readable medium storing an image processing program capable of instructing a computer to function as the image processing device according to claim 16.

19. An image processing device comprising:
an image input section which reads a plurality of images of imaging a same object;
a position discrepancy detecting section which detects position discrepancy of patterns between the plurality of images; and
an image composition section which positions and composes the patterns of the plurality of images based on the position discrepancy, wherein
the image composition section finds a difference of gradation value of target pixels at respective corresponding positions in a positioning reference image and other images, and locally lowers the composite rate of the other images at portions where the difference of gradation value is judged to be large.

20. An electronic camera comprising:
the image processing device according to claim 19; and
an imaging section which consecutively images objects and generates a plurality of images, wherein
the electronic camera has a function of positioning and composing the plurality of images with the image processing device.

21. A non-transitory computer readable medium storing an image processing program capable of instructing a computer to function as the image processing device according to claim 19.

* * * * *